(12) United States Patent
Nadamoto (10) Patent No.: US 12,160,667 B2
(45) Date of Patent: Dec. 3, 2024

(54) CONTROL APPARATUS, IMAGE PICKUP APPARATUS, LENS APPARATUS, CONTROL METHOD, AND STORAGE MEDIUM, THAT DETERMINE CORRECTION RATIOS BETWEEN MULTIPLE IMAGE STABILIZERS

(71) Applicant: CANON KABUSHIKI KAISHA, Tokyo (JP)

(72) Inventor: Ken Nadamoto, Saitama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 79 days.

(21) Appl. No.: 17/981,775

(22) Filed: Nov. 7, 2022

(65) Prior Publication Data
US 2023/0146629 A1 May 11, 2023

(30) Foreign Application Priority Data
Nov. 10, 2021 (JP) .................................. 2021-183698

(51) Int. Cl.
*H04N 23/68* (2023.01)
*G03B 5/04* (2021.01)

(52) U.S. Cl.
CPC ............. *H04N 23/687* (2023.01); *G03B 5/04* (2013.01); *G03B 2205/0015* (2013.01)

(58) Field of Classification Search
CPC ...... H04N 23/687; H04N 23/683; G03B 5/04; G03B 2205/0015; G02B 27/646
See application file for complete search history.

(56) References Cited

U.S. PATENT DOCUMENTS

| 8,155,512 | B2* | 4/2012 | Honjo | H04N 23/663 |
| | | | | 396/55 |
| 10,554,893 | B2* | 2/2020 | Takayanagi | H04N 23/6812 |
| 10,904,441 | B2* | 1/2021 | Tanaka | H04N 23/6812 |
| 11,159,726 | B2* | 10/2021 | Ito | G03B 5/00 |
| 2005/0140793 | A1* | 6/2005 | Kojima | H04N 23/687 |
| | | | | 348/208.99 |

(Continued)

FOREIGN PATENT DOCUMENTS

| EP | 3843377 A1 | 6/2021 |
| JP | H11101998 A | 4/1999 |
| JP | 5197126 B2 | 5/2013 |

OTHER PUBLICATIONS

Extended European search report issued in European Appln. No. 22206393.5 mailed on Feb. 6, 2023.

(Continued)

*Primary Examiner* — Padma Haliyur
(74) *Attorney, Agent, or Firm* — ROSSI, KIMMS & McDOWELL LLP (57) ABSTRACT

A control apparatus configured to perform image stabilization using a first image stabilization unit and a second image stabilization unit includes a determining unit configured to determine a correction ratio between the first image stabilization unit and the second image stabilization unit. The determining unit determines the correction ratio between the first image stabilization unit and the second image stabilization unit such that a proportion of the second image stabilization unit in the correction ratio increases as a distance to a movable end of the first image stabilization unit decreases.

14 Claims, 10 Drawing Sheets

(56) References Cited

U.S. PATENT DOCUMENTS

| | | | |
|---|---|---|---|
| 2011/0102655 A1* | 5/2011 | Fujiyama | H04N 23/6811 |
| | | | 348/E5.091 |
| 2015/0281582 A1* | 10/2015 | Sakurai | H04N 23/6812 |
| | | | 348/208.2 |
| 2016/0173781 A1 | 6/2016 | Tsuchiya | |
| 2019/0191088 A1 | 6/2019 | Murashima | |
| 2019/0215454 A1* | 7/2019 | Kimura | H04N 23/6811 |
| 2019/0260933 A1* | 8/2019 | Tanaka | H04N 23/81 |
| 2019/0289216 A1* | 9/2019 | Ito | G02B 27/646 |
| 2020/0084358 A1 | 3/2020 | Nadamoto | |
| 2020/0162674 A1* | 5/2020 | Ito | G03B 5/00 |
| 2021/0105408 A1 | 4/2021 | Hirai | |
| 2021/0360159 A1* | 11/2021 | Shingu | H04N 23/683 |

OTHER PUBLICATIONS

Communication Pursuant to Article 94(3) EPC issued in European Appln. No. 22206393.5, mailed Jan. 16, 2024.

\* cited by examiner

CONTROL APPARATUS, IMAGE PICKUP APPARATUS, LENS APPARATUS, CONTROL METHOD, AND STORAGE MEDIUM, THAT DETERMINE CORRECTION RATIOS BETWEEN MULTIPLE IMAGE STABILIZERS

BACKGROUND

Technical Field

The disclosure relates to control apparatuses, image pickup apparatuses, lens apparatuses, control methods, and storage media.

Description of the Related Art

An electronic image-stabilization method (EIS) that electronically corrects image blur and an optical image-stabilization method that optically corrects image blur are conventionally known. An optical image-stabilization method includes a lens shift type image stabilization method (OIS) that moves a correction lens constituting part of an imaging optical system in a direction that intersects an optical axis, and an image-sensor shift type image stabilization system (IIS) that moves an image sensor in a direction that intersects the optical axis.

Japanese Patent Laid-Open No. 11-101998 discloses a method of starting the IIS using the image sensor in a case where a correction amount of the correction lens in the OIS reaches a limit of the movable range. Japanese Patent No. 5197126 discloses an image pickup apparatus that performs image stabilization (IS) control by reducing a proportion of the OIS in a correction ratio and increasing a proportion of the IIS in the correction ratio, as the correction amount of the correction lens in the OIS increases.

The method disclosed in Japanese Patent Laid-Open No. 11-101998 discontinuously changes the correction ratio between the OIS and the IIS, causes overshoot in which the correction lens or the image sensor is moved beyond the command value, or an IS member to delay following the command value, and deteriorates the IS performance. At that time, shake and noise are generated, the IS quality is deteriorated, and the noise is recorded in a captured moving image. The image pickup apparatus disclosed in Japanese Patent No. 5197126 cannot make high-performance IS because when the correction lens contacts the movable end in the OIS, a proportion of the IIS using the image sensor in the correction ratio is not 100%.

SUMMARY

The disclosure provides a control apparatus, an image pickup apparatus, a lens apparatus, a control method, and a storage medium, each of which can perform high-quality and high-performance image stabilization using a plurality of image stabilization units.

A control apparatus according to one aspect of the disclosure configured to perform image stabilization using a first image stabilization unit and a second image stabilization unit includes at least one processor, and a memory coupled to the at least one processor, the memory having instructions that, when executed by the processor, perform operations as a determining unit configured to determine a correction ratio between the first image stabilization unit and the second image stabilization unit. The determining unit determines the correction ratio between the first image stabilization unit and the second image stabilization unit such that a proportion of the second image stabilization unit in the correction ratio increases as a distance to a movable end of the first image stabilization unit decreases.

A control method according to another aspect of the disclosure for performing image stabilization using a first image stabilization unit and a second image stabilization unit, the control method comprising a determination step of determining a correction ratio between the first image stabilization unit and the second image stabilization unit. The determination step determines the correction ratio between the first image stabilization unit and the second image stabilization unit such that a proportion of the second image stabilization unit in the correction ratio increases as a distance to a movable end of the first image stabilization unit decreases. A storage medium storing a program that causes a computer to execute the above control method also constitutes another aspect of the disclosure.

Further features of the disclosure will become apparent from the following description of exemplary embodiments with reference to the attached drawings.

DESCRIPTION OF THE EMBODIMENTS

Referring now to the accompanying drawings, a detailed description will be given of embodiments according to the disclosure.

First Embodiment

Figure 1:
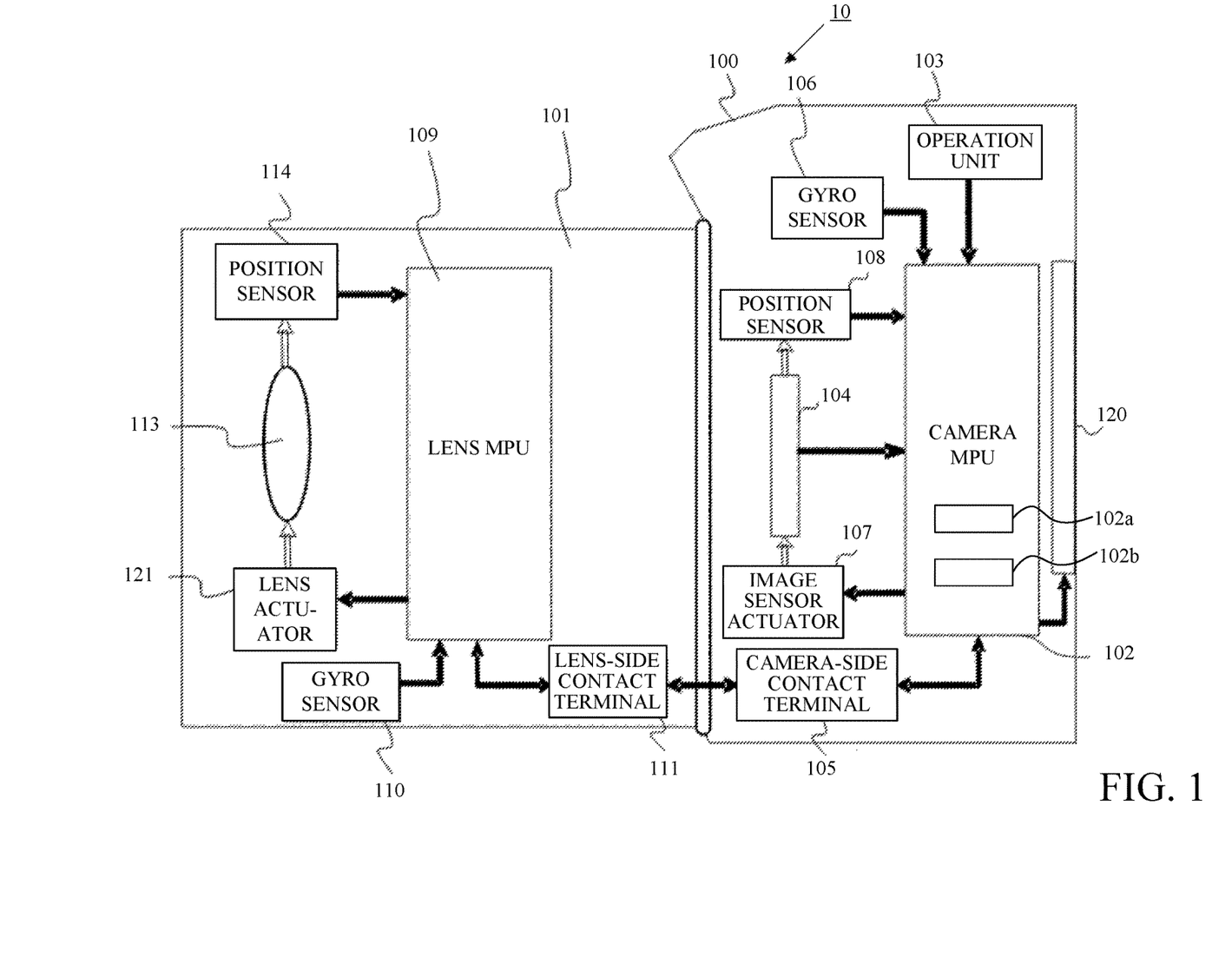
FIG. 1 is a block diagram of an imaging system according to a first embodiment.

Referring now to FIG. 1, a description will be given of an imaging system 10 according to a first embodiment of the disclosure. FIG. 1 is a block diagram of an imaging system 10. As illustrated in FIG. 1, the imaging system 10 includes a camera body (image pickup apparatus) 100 and an interchangeable lens (lens apparatus) 101. The camera body 100 and the interchangeable lens 101 are attachable to and detachable from each other and connected to communicate with each other. However, this embodiment is not limited to this example, and is applicable to an image pickup apparatus in which a camera body and a lens apparatus are integrated with each other.

The camera body 100 includes a camera MPU 102, an operation unit 103, an image sensor 104, a camera-side contact terminal 105, a gyro sensor 106, an image sensor actuator 107, a position sensor 108, and a rear display (unit) 120. The camera MPU (control apparatus) 102 includes a computer that controls overall control of the camera body 100 and the interchangeable lens 101, and controls various operations such as auto-exposure (AE), autofocus (AF), and imaging according to an input from an operation unit 103, which will be described below. The MPU 102 includes at least one processor, and a memory coupled to the at least one processor. The memory has instructions that, when executed by the processor, perform various operations. The camera MPU 102 communicates various commands and information with a lens MPU (control apparatus) 109 as a computer through the camera-side contact terminal 105 and a lens-side contact terminal 111 provided on the interchangeable lens 101. The camera-side contact terminal 105 and the lens-side contact terminal 111 also include power terminals for supplying power from the camera body 100 to the interchangeable lens 101.

The operation unit 103 includes a mode dial for setting various imaging modes, a release button for instructing a start of an imaging preparation operation and an imaging operation, and the like. A half-press operation of the release button turns on a first switch SW1, and a full-press operation turns on a second switch SW2. When the first switch SW1 is turned on, AE and AF are performed as imaging preparation operations, and when the second switch SW2 is turned on, a start of an imaging (exposure) operation is instructed, and the imaging operation is started a predetermined time after this instruction. Turning off and on of the first switch SW1 and the second switch SW2 are notified from the camera MPU 102 to the lens MPU 109 through communication.

The image sensor 104 includes a photoelectric conversion element such as a CCD sensor or a CMOS sensor, and photoelectrically converts an object image (optical image) formed by the imaging optical system of the interchangeable lens 101 to generate an imaging signal (image data). The camera MPU 102 generates a still image and a moving image (video signal) using the imaging signal from the image sensor 104.

A gyro sensor (camera-side gyro sensor) 106 is a shake sensor that detects angular shake (camera shake) of the camera body 100 due to manual shake or the like and outputs a camera shake detection signal as an angular velocity signal. The camera MPU 102 drives the image sensor actuator 107 based on the camera shake detection signal and a proportion of IIS in a correction ratio received from the interchangeable lens 101, which will be described below, to move the image sensor 104 in a direction orthogonal to the optical axis of the imaging optical system. This configuration reduces (corrects) image blur caused by the camera shake. At this time, the camera MPU 102 feedback-controls the image sensor actuator 107 so that a position of the image sensor 104 detected by the position sensor (image sensor position sensor) 108 (a moving amount from the position on the optical axis as a moving center) approaches a target position. Thereby, IIS is performed by moving the image sensor 104. In this embodiment, the image sensor 104 corresponds to a second image stabilization unit (second IS unit). The IIS is performed for camera shake in the vertical direction (pitch direction) and camera shake in the horizontal direction (yaw direction).

The rear display (display unit) 120 displays a moving image corresponding to the video signal generated by the camera MPU 102 based on the imaging signal from the image sensor 104. Before imaging, the user can observe the displayed image as a viewfinder image (live-view image). After imaging, a still image or moving image for recording generated by imaging can be displayed on the rear display 120. In this embodiment, "imaging" means imaging for recording.

The interchangeable lens 101 includes the lens MPU 109, a gyro sensor 110, the lens-side contact terminal 111, a correction lens 113 that constitutes part of the imaging optical system, and a position sensor 114. The gyro sensor (lens-side gyro sensor) 110 is a shake sensor that detects angular shake (lens shake) of the interchangeable lens 101 and outputs a lens-shake detection signal as an angular velocity signal.

The lens MPU 109 drives the lens actuator 112 based on the lens-shake detection signal and a proportion of OIS in the correction ratio, which will be described below, to move the correction lens (optical element) 113, which constitutes the part of the imaging optical system, in a direction orthogonal to the optical axis of the imaging optical system. This configuration reduces (corrects) image blur caused by lens shake. At this time, the lens MPU 109 performs feedback control over the lens actuator 112 so that a position of the correction lens 113 detected by the position sensor (lens position sensor) 114 (a moving amount from the position on the optical axis as the moving center) approaches a target position. Thereby, OIS is performed by moving the correction lens 113. In this embodiment, the correction lens 113 corresponds to a first image stabilization unit (first IS unit).

OIS is also performed for lens shake in the pitch direction and lens shake in the yaw direction, similar to the IIS. The correction lens 113 may be moved in a direction orthogonal to the optical axis (a direction intersecting the optical axis), may be translated in a plane perpendicular to the optical axis, or may be moved about a point on the optical axis as a center.

In this embodiment, the camera MPU 102 includes a calculating unit 102a and a determining unit 102b, and performs image stabilization using the correction lens (first IS unit) 113 and an image sensor (second IS unit) 104. The calculating unit 102a calculates the shortest distance from the current position of the correction lens 113 to the position of the movable end. The determining unit 102b determines the correction ratio (proportion of OIS in the correction ratio and proportion of IIS in the correction ratio) between the correction lens 113 and the image sensor 104 so that a proportion of the image sensor 104 in the correction ratio increases as the shortest distance becomes shorter.

Figure 2A:
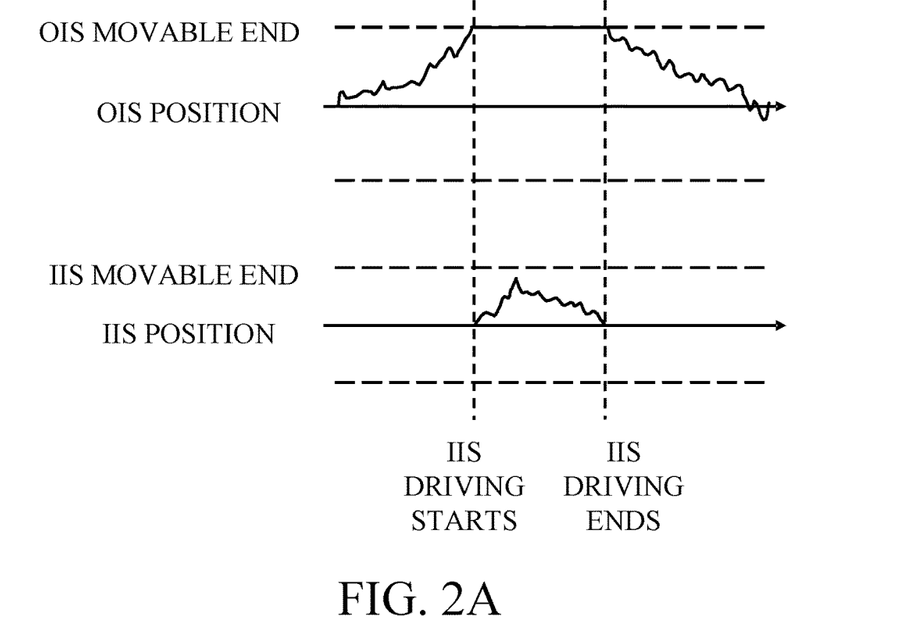
FIGS. 2A and 2B explain temporal changes in correction command values for OIS and IIS according to the first embodiment.
Figure 2B:
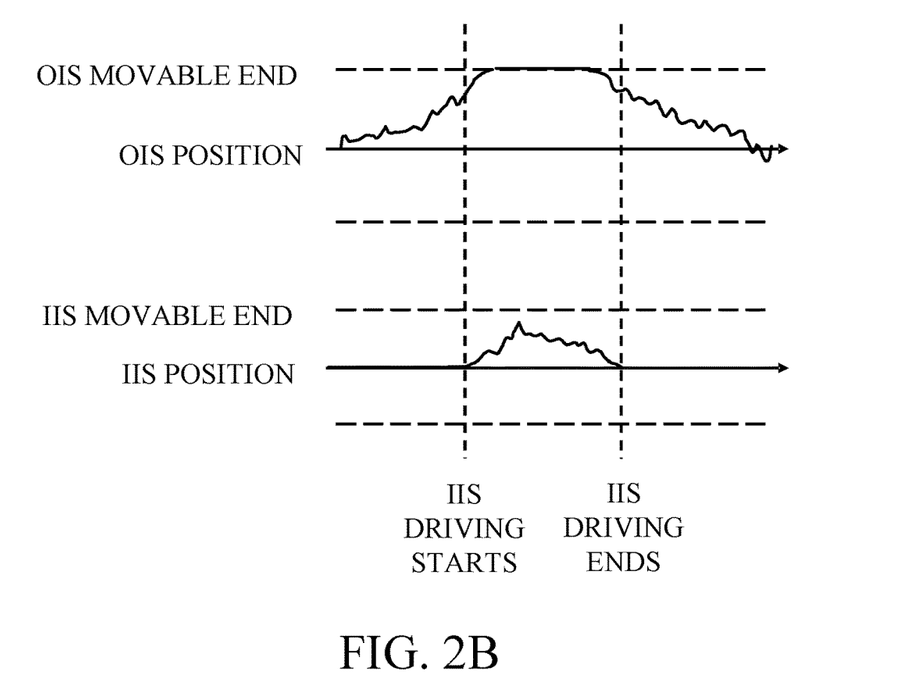

Referring now to FIGS. 2A and 2B, a description will be given of temporal changes in correction command values for OIS and IIS. FIG. 2A explains temporal changes in correction command values for OIS and IIS according to a comparative example, and FIG. 2B explains the temporal changes in correction command values for OIS and IIS according to this embodiment.

FIG. 2A illustrates correction command values of OIS and IIS in a case where OIS using the correction lens 113 is preferentially performed and IIS is used to correct only blur (correction residue) that cannot be corrected when the correction lens 113 reaches the movable end. This control method provides control such that the correction command values of the OIS and the IIS are suddenly stopped and driven at the timing of starting and stopping driving the IIS. In the case where the correction command value is suddenly stopped, the position of an image stabilization member such as the correction lens 113 cannot actually stop, and an overshoot beyond the correction command value occurs. In this case, the correction member will perform an operation that is irrelevant to shake, and the image stabilization performance will be deteriorated. In a case where the image stabilization control is suddenly started, the image stabilization member cannot follow the correction command value at first and the image stabilization member is moved according to the correction command value after a predetermined time elapses. This case also leads to deterioration of the image stabilization performance. If OIS and IIS are to be suddenly stopped or driven, shake and noise are generated and impair the usability of the user and the noise is recorded in the captured video. In order to solve this problem, the following countermeasure is taken in this embodiment.

FIG. 2B illustrates correction command values for OIS and IIS according to this embodiment. Until the shortest distance to the movable end of the correction lens 113 in the OIS becomes equal to or less than a threshold, image stabilization (image stabilization control) is performed only by the OIS. On the other hand, when the shortest distance to the movable end of the correction lens 113 is equal to or less than the threshold, the IIS by the image sensor 104 is started. As the shortest distance to the movable end of the correction lens 113 becomes smaller, the proportion of the OIS in the correction ratio is decreased and the proportion of the IIS in the correction ratio is increased. Therefore, the proportion of the OIS in the correction ratio is made low before the correction lens 113 contacts the movable end, and a changing amount in the correction command value when the correction lens 113 actually contacts the movable end becomes small. As a result, overshoot is less likely to occur. In a case where the IIS is started, the correction command value of the IIS gradually increases from a small value, so a follow-up delay in the IIS is unlikely to occur. Since the correction lens 113 in the OIS and the image sensor 104 in the IIS are not suddenly stopped or driven, noise or shake can be prevented.

Figure 3:
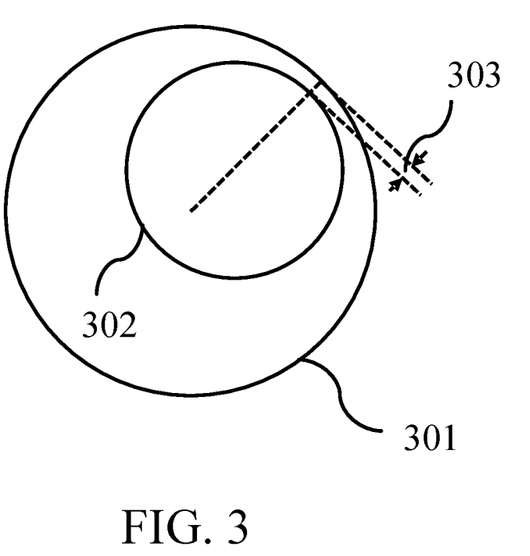
FIG. 3 explains the shortest distance to a movable end of the correction lens according to the first embodiment.

Referring now to FIG. 3, a description will be given of the shortest distance to the movable end of the correction lens 113 in OIS. FIG. 3 explains the shortest distance to the movable end of the correction lens 113. Reference numeral 301 denotes the movable range of the correction lens 113 in the OIS. Since the movable range 301 may change depending on a zoom state and a focus state of the imaging optical system in the interchangeable lens 101, it is necessary to take this fact into account. Depending on the mechanical configuration, the movable range 301 may not be circular. Reference numeral 302 denotes the position of the correction lens 113 in the OIS. During the OIS, the correction lens 113 can be driven (moved) only within the movable range 301. In a case where the correction lens 113 exists at the position 302, a length 303 is the shortest distance to the movable end of the correction lens 113 (the shortest distance between the end of the movable range 301 of the correction lens 113 and the end of the position 302 of the correction lens 113).

Figure 4:
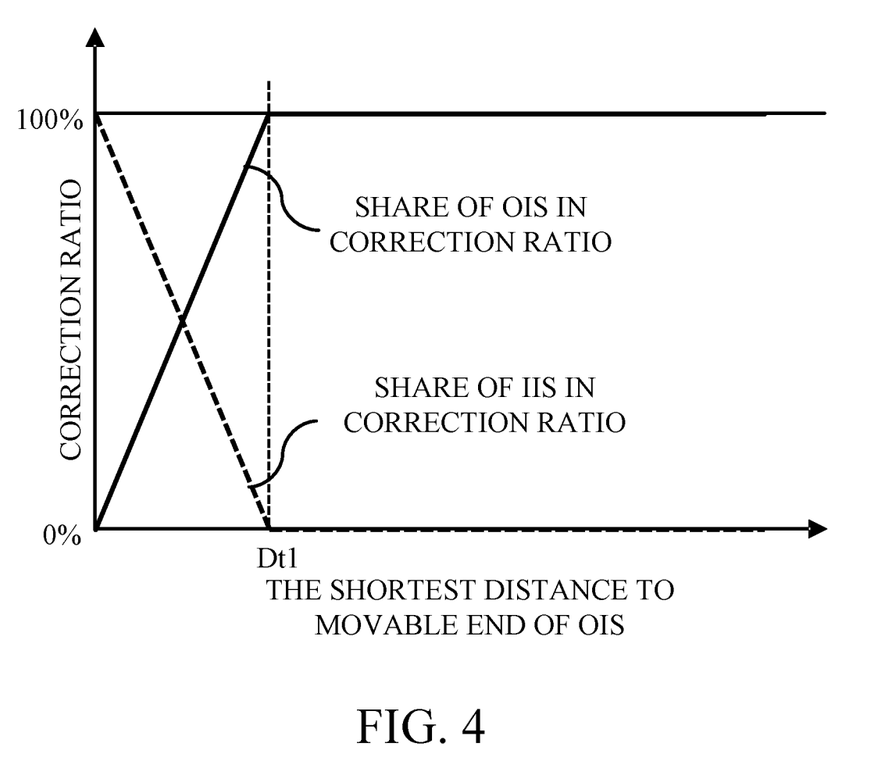
FIG. 4 illustrates a relationship between the shortest distance to the movable end of the OIS and the correction ratio according to the first embodiment.

Referring now to FIG. 4, a description will be given of a relationship between the shortest distance to the movable end of the correction lens 113 in the OIS (the shortest distance to the movable end of the OIS) and the correction ratio between the OIS and the IIS. FIG. 4 illustrates a relationship between the shortest distance to the movable end of the OIS and the correction ratio. In FIG. 4, an abscissa axis indicates the shortest distance to the movable end of the OIS, and an ordinate axis indicates the correction ratio.

In a case where the shortest distance to the movable end of the correction lens 113 in the OIS is larger than a threshold Dt1, the proportion of the OIS in the correction ratio is set to 100%, and image stabilization control is performed only with the OIS. On the other hand, in a case where the shortest distance to the movable end of the correction lens 113 in the OIS becomes smaller than the threshold Dt1, driving of the image sensor 104 in the IIS is started. As the shortest distance to the movable end of the correction lens 113 in the OIS becomes smaller, the proportion of the IIS in the correction ratio is increased and the proportion of the OIS in the correction ratio is decreased. In a case where the shortest distance to the movable end of the correction lens 113 in the OIS becomes 0, that is, in a case where the correction lens 113 contacts the movable end (the correction lens 113 reaches the movable end), the proportion of the IIS in the correction ratio is set to 100%, and image stabilization control is performed only with the IIS.

The threshold Dt1 for starting the IIS (starting driving the image sensor 104) may be changed according to the control characteristics of the OIS and the IIS (such as an overshoot characteristic and a follow-up characteristic). For example, in a case where the control characteristics of the OIS and the IIS are such that overflow is less likely to occur and the follow-up characteristic is good, the threshold Dt1 may be made smaller and only the OIS may be used for image stabilization (image stabilization control) until the OIS becomes closer to the movable end. Although the proportion of the OIS in correction ratio and the proportion of the IIS in the correction ratio are linearly changed in FIG. 4, the disclosure is not limited to this example and they may be changed according to a nonlinear function, or stepwise, or the like. This is similarly applied to other embodiments.

Figure 5:
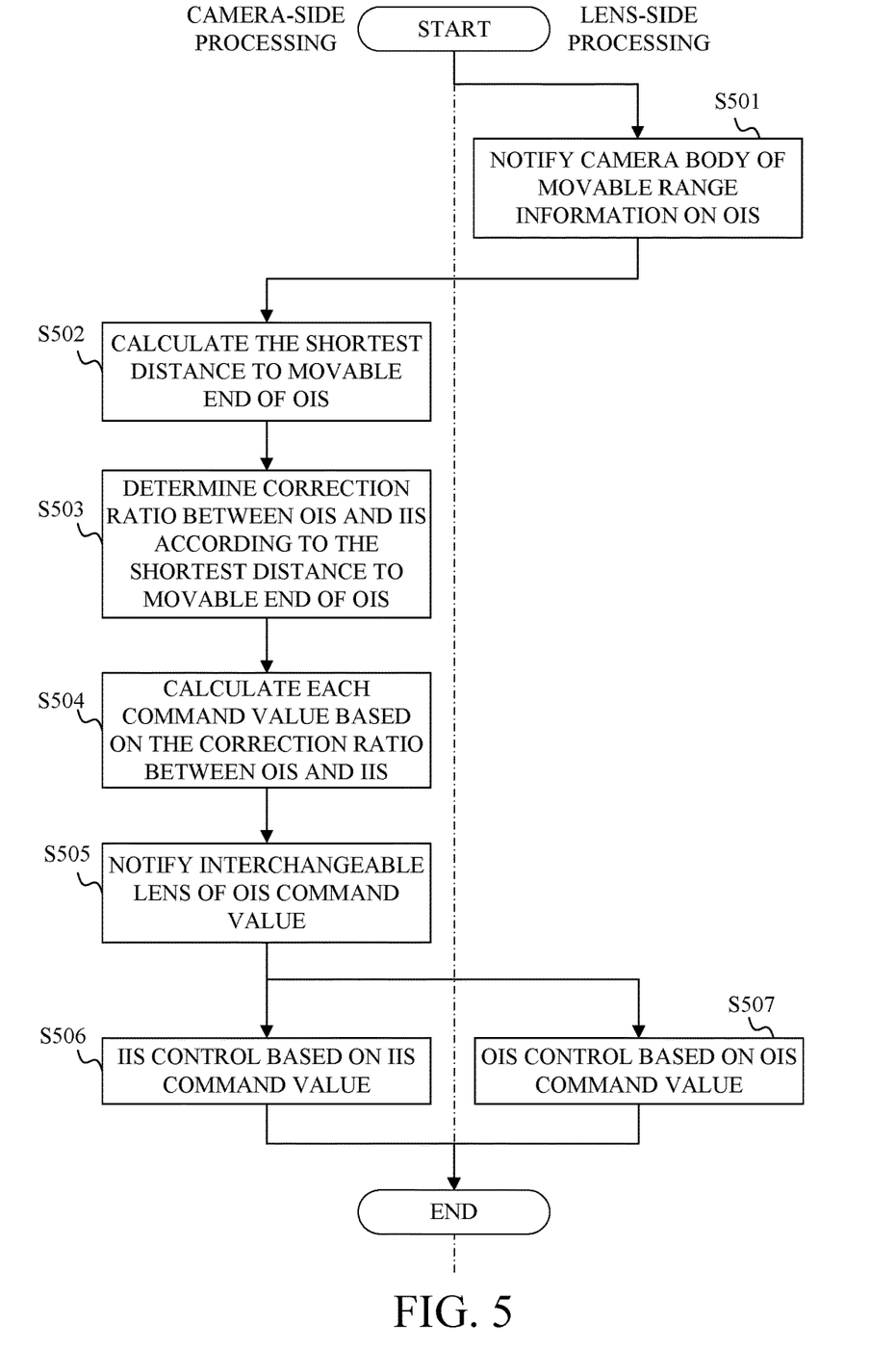
FIG. 5 is a flowchart of image stabilization processing according to the first embodiment.

Referring now to FIG. 5, a description will be given of image stabilization processing (control method) in the imaging system 10 according to this embodiment. FIG. 5 is a flowchart of the image stabilization processing. The left side of FIG. 5 illustrates processing to be performed by the camera body 100 (camera MPU 102), and the right side illustrates processing to be performed by the interchangeable lens 101 (lens MPU 109). The camera MPU 102 and lens MPU 109 execute the image stabilization processing according to a computer program. In a case where the camera body 100 is powered on, power is supplied to the interchangeable lens 101, and communication between the camera MPU 102 and the lens MPU 109 is started, this processing is started in step S501.

First, in step S501, the lens MPU 109 notifies the camera body 100 of movable range information on the correction lens 113 in OIS. The movable range information includes information on a maximum correctable amount of the movable range of the correction lens 113 that varies according to the focus state and the zoom state of the interchangeable lens 101 and the like.

Next, in step S502, the camera MPU 102 calculates the shortest distance to the movable end of the correction lens 113 as described with reference to FIG. 3, based on the movable range information on the correction lens 113 in the OIS and the current position of the correction lens 113. The current position of the correction lens 113 can be received as position information actually detected by the position sensor 114 from the interchangeable lens 101. Alternatively, the current position may be set to a correction command value for the correction lens 113 transmitted to the interchangeable lens 101 immediately before in step S505.

Next, in step S503, the camera MPU 102 determines the correction ratio between the OIS and the IIS based on the shortest distance to the movable end of the correction lens 113, as described with reference to FIG. 4. Next, in step S504, the camera MPU 102 calculates a command value (correction command value) for each of the OIS and the IIS based on the correction ratio between the OIS and the IIS determined in step S503. By multiplying all the correction command values by each proportion in the correction ratio, the correction command values of the OIS and the IIS can be acquired. Next, in step S505, the camera MPU 102 notifies the interchangeable lens 101 of the correction command value (OIS command value) for the OIS calculated in step S504.

Next, in step S506, the camera MPU 102 performs IIS (image stabilization control (IIS control) using the image sensor 104) in accordance with the correction command value (IIS command value) for the IIS calculated in step S504. In step S507, the lens MPU 109 performs OIS (image stabilization control (OIS control) using the correction lens 113) in accordance with the correction command value (OIS command value) of the OIS notified from the camera MPU 102 in step S505.

Cooperative image stabilization can be performed with the OIS and IIS by repeating the above steps at a high-speed period. This embodiment preferentially uses the OIS for image stabilization control, and uses the IIS to correct blur (correction residue) that cannot be completely corrected by the OIS alone. This configuration can provide image stabilization control that does not cause deterioration of image stabilization performance, noise, or shake.

In this embodiment, the second image stabilization unit includes the image sensor 104, but is not limited to this example, and may include an electronic image stabilization unit of an electronic image stabilization method (EIS).

Second Embodiment

A description will now be given of a second embodiment according to the disclosure. In the first embodiment, in a case where image stabilization performance and the power consumption performance of OIS are higher than those of IIS, the OIS is preferentially used for image stabilization control, and the IIS is used to correct blur that cannot be corrected by the OIS. On the other hand, in the disclosure, IIS has image stabilization performance and power consumption performance higher than those of OIS, the IIS is preferentially used for image stabilization, and the OIS is used to correct blur that cannot be corrected by the IIS. That is, in this embodiment, the image sensor 104 corresponds to the first image stabilization unit, and the correction lens 113 corresponds to the second image stabilization unit. A basic configuration of the imaging system 10 (camera body 100 and interchangeable lens 101) according to this embodiment is similar to that of the first embodiment described with reference to FIG. 1, corresponding elements will be designated by the same reference numerals, and a description thereof will be omitted.

Figure 6:
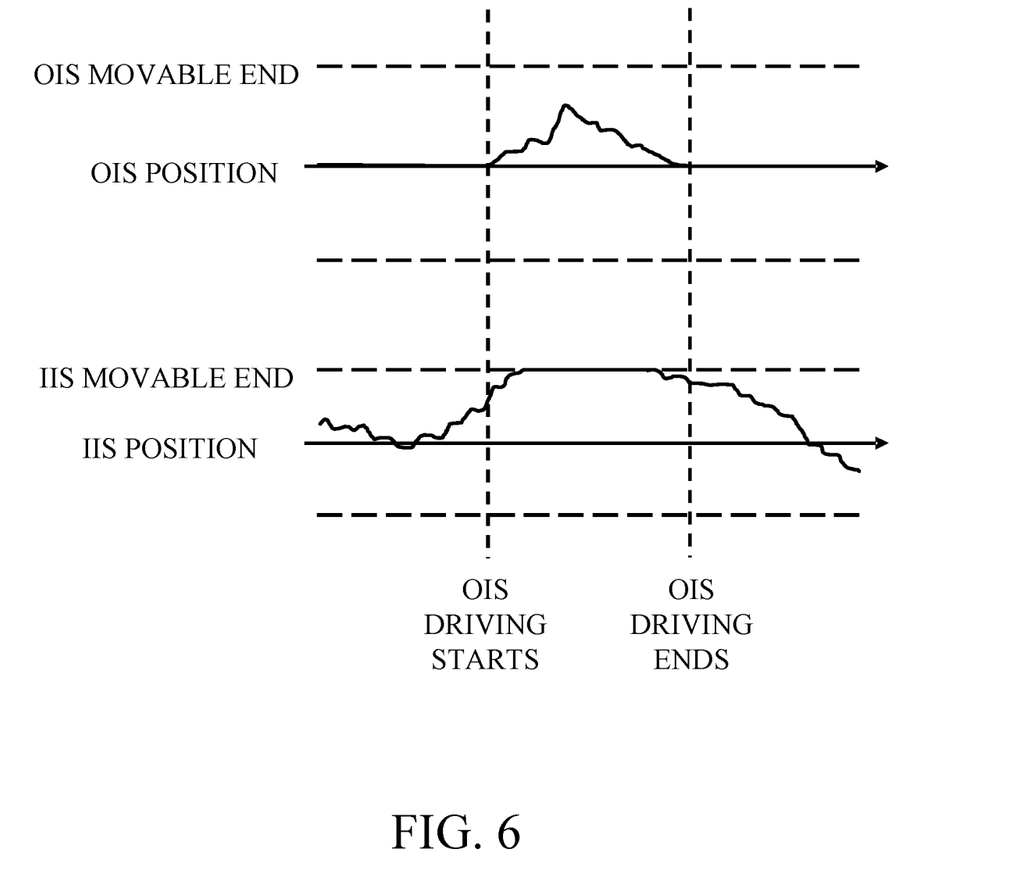
FIG. 6 explains temporal changes in correction command values for OIS and IIS according to a second embodiment.

Referring now to FIG. 6, a description will be given of temporal changes in correction command values for OIS and IIS according to this embodiment. FIG. 6 explains temporal changes in correction command values for OIS and IIS according to this embodiment.

Until the shortest distance to the movable end of the image sensor 104 in the IIS becomes equal to or less than a threshold, image stabilization (image stabilization control) is performed only by the IIS. On the other hand, in a case where the shortest distance to the movable end of the image sensor 104 is equal to or less than the threshold, the OIS using the correction lens 113 is started. As the shortest distance to the movable end of the image sensor 104 becomes smaller, the proportion of the IIS in the correction ratio is decreased and the proportion of the OIS in the correction ratio is increased. Therefore, the proportion of the IIS in the correction ratio is made smaller before the image sensor 104 contacts the movable end, and a changing amount in the correction command value becomes small when the image sensor 104 actually contacts the movable end. As a result, overshoot is less likely to occur. In addition, since the correction command value of the OIS gradually increases from a small value when the OIS is started, a follow-up delay in the OIS is less likely to occur. Since the image sensor 104 in the IIS and the correction lens 113 in the OIS are not suddenly stopped or driven, noise and shake can be prevented.

Figure 7:
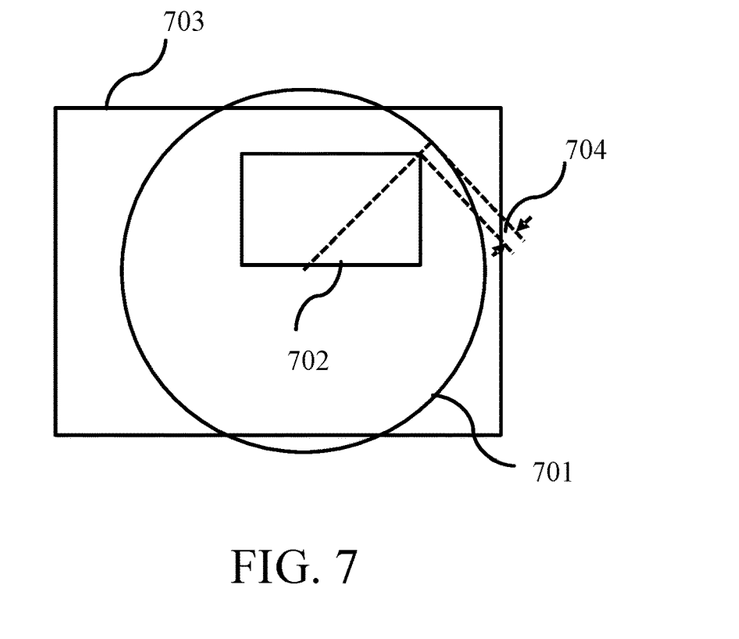
FIG. 7 explains the shortest distance to the movable end of the image sensor according to the second embodiment.

Referring now to FIG. 7, a description will be given of the shortest distance to the movable end of the image sensor 104 in IIS. FIG. 7 explains the shortest distance to the movable end of the image sensor 104. Reference numeral 701 denotes an image circle. The image circle 701 changes according to the focus state and the zoom state of the imaging optical system in the interchangeable lens 101, the center position shifts depending on the interchangeable lens 101, and thus it is necessary to receive information on these changes from the interchangeable lens 101 by communication. Reference numeral 702 denotes an effective diameter to be actually recorded as a captured image in the image sensor 104. The size of the effective area 702 changes depending on a moving image capturing mode or the like.

In the camera body 100, if the effective area 702 of the image sensor 104 protrudes outside the image circle 701, light shielding will occur in a captured image. Therefore, in IIS, it is necessary to drive the image sensor 104 so that the effective area 702 of the image sensor 104 falls within the range of the image circle 701. Reference numeral 703 denotes a range in which an effective area 702 of the image sensor 104 can exist in a case where the image sensor 104 is moved within a range in which the image sensor 104 can be driven mechanically and electrically in the IIS. As described above, the movable range of the image sensor 104 in the IIS is a range in which the effective area 702 of the image sensor 104 is within the range of the image circle 701 and inside the range 703. In a case where the current position of the image sensor 104 is a position of the effective area 702 illustrated in FIG. 7, a length 704 becomes the shortest distance to the movable end of the image sensor 104 in the IIS (the shortest distance between the edge of the image circle 701 and the edge of the effective area 702 as the current position).

Figure 8:
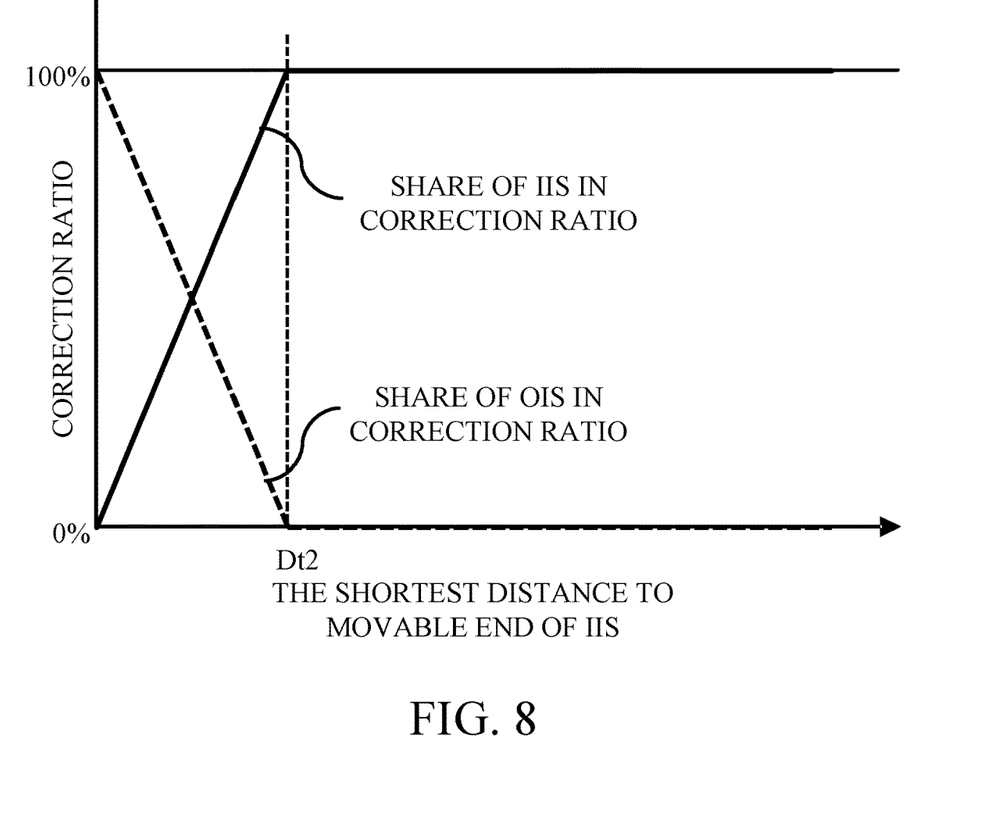
FIG. 8 illustrates a relationship between the shortest distance to the movable end of the IIS and the correction ratio according to the second embodiment.

Referring now to FIG. 8, a description will be given of a relationship between the shortest distance to the movable end of the image sensor 104 in the IIS (the shortest distance to the movable end of IIS) and the correction ratio between the OIS and the IIS. FIG. 8 illustrates a relationship between the shortest distance to the movable end of the IIS and the correction ratio. In FIG. 8, an abscissa axis indicates the shortest distance to the movable end of the IIS, and an ordinate axis indicates the correction ratio.

In a case where the shortest distance to the movable end of the image sensor 104 in the IIS is larger than a threshold Dt2, the proportion of the IIS in the correction ratio is set to 100%, and image stabilization control is performed only by the IIS. On the other hand, in a case where the shortest distance to the movable end of the image sensor 104 in the IIS is smaller than the threshold Dt2, driving of the correction lens 113 in the OIS is started. As the shortest distance to the movable end of the image sensor 104 in the IIS is smaller, the proportion of the OIS in the correction ratio is increased and the proportion of the IIS in the correction ratio is decreased. In a case where the shortest distance to the movable end of the image sensor 104 in the IIS becomes 0, that is, in a case where the image sensor 104 reaches the movable end, the proportion of the OIS in the correction ratio is set to 100%, and only the OIS is used for image stabilization control. Threshold Dt2 for starting the OIS (starting driving the correction lens 113) may be changed according to the control characteristics (such as an overshoot characteristic and a follow-up characteristic) of the OIS and the IIS.

Figure 9:
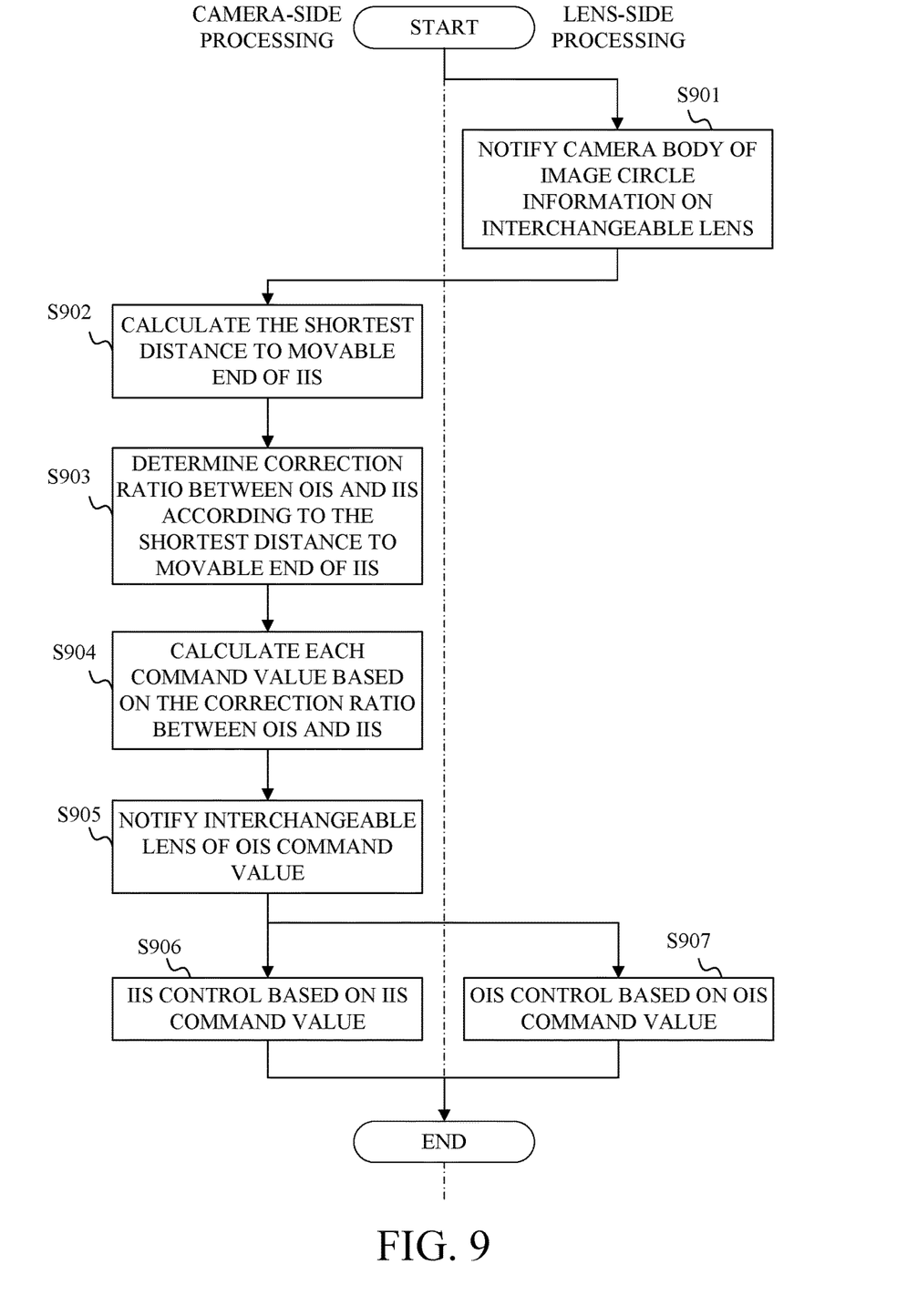
FIG. 9 is a flowchart of image stabilization processing according to the second embodiment.

Referring now to FIG. 9, a description will be given of image stabilization processing (control method) in the imaging system 10 according to this embodiment. FIG. 9 is a flowchart of the image stabilization processing. The left side of FIG. 9 illustrates processing to be performed by the camera body 100 (camera MPU 102), and the right side illustrates processing to be performed by the interchangeable lens 101 (lens MPU 109). The camera MPU 102 and lens MPU 109 execute the image stabilization processing according to a computer program. In a case where the camera body 100 is powered on, power is supplied to the interchangeable lens 101, and communication between the camera MPU 102 and the lens MPU 109 is started, this processing is started in step S901.

First, in step S901, the lens MPU 109 notifies the camera body 100 of image circle information on the interchangeable lens 101. The image circle information includes information on the radius of the image circle and the center position of the image circle.

Next, in step S902, the camera MPU 102 calculates the shortest distance to the movable end of the image sensor 104 in the IIS. The shortest distance is calculated based on the image circle information received from the lens MPU 109, the information on the effective area of the image sensor 104, and a stroke amount that can be mechanically and electrically driven in the IIS, as explained with reference to FIG. 7.

Next, in step S903, the camera MPU 102 determines the correction ratio between the OIS and the IIS, as described with reference to FIG. 8, based on the shortest distance to the movable end of the image sensor 104 calculated in the step S902. Next, in step S904, the camera MPU 102 calculates a command value (correction command value) for each of the OIS and the IIS based on the correction ratio between the OIS and the IIS determined in step S903. Next, in step S905, the camera MPU 102 notifies the interchangeable lens 101 of the correction command value (OIS command value) for the OIS calculated in step S904.

Next, in step S906, the camera MPU 102 performs the IIS (image stabilization control (IIS control) using the image sensor 104) in accordance with the correction command value (IIS command value) for the IIS calculated in step S904. In step S907, the lens MPU 109 performs the OIS (image stabilization control (OIS control) using the correction lens 113) in accordance with the correction command value (OIS command value) for the OIS notified from the camera MPU 102 in step S905.

Cooperative image stabilization can be performed with the OIS and IIS by repeating the above steps at a high-speed period. This embodiment preferentially uses the IIS for image stabilization control and uses the OIS to correct blur (correction residue) that cannot be completely corrected by the IIS alone. This configuration can provide image stabilization control that does not cause deterioration of image stabilization performance, noise, or shake.

In this embodiment, the second image stabilization unit includes the correction lens 113, but it is not limited to this example, and may include the electronic image stabilization unit of the electronic image stabilization method (EIS).

Third Embodiment

A description will now be given of a third embodiment according to the disclosure. The first and second embodiments discuss the configuration for performing image stabilization control using OIS and IIS. On the other hand, this embodiment will discuss a configuration for performing image stabilization control using, an electronic image stabilization method (EIS) in addition to the OIS and the IIS. That is, in this embodiment, the correction lens (first image stabilization unit) 113, the image sensor (second image stabilization unit) 104, and the electronic image stabilization unit (third image stabilization unit) are used for image stabilization. This embodiment assumes that image stabilization performance is higher in order of OIS, IIS, and EIS. That is, a configuration will be described in which image stabilization control is performed using the OIS as the first priority, the IIS as the second priority, and the EIS for the blur residue. A basic configuration of the imaging system 10 (camera body 100 and interchangeable lens 101) according to this embodiment is similar to that of the first embodiment described with reference to FIG. 1, corresponding elements will be designated by the same reference numerals, and a description thereof will be omitted.

Figure 10:
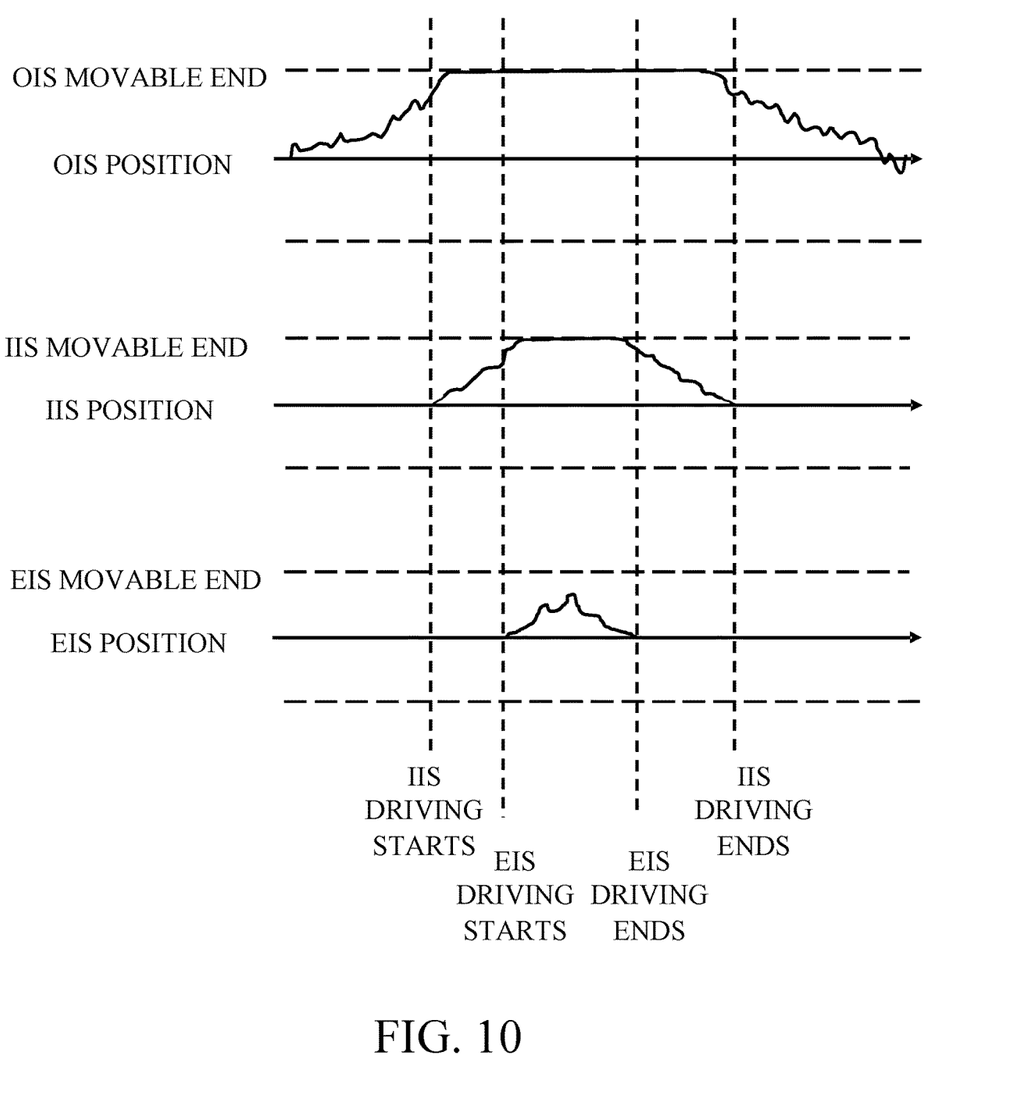
FIG. 10 explains temporal changes in correction command values for OIS, IIS, and EIS according to a third embodiment.

Referring now to FIG. 10, a description will be given of temporal changes in correction command values for OIS, IIS, and EIS in this embodiment. FIG. 10 explains temporal changes in the correction command values for the OIS, IIS, and the EIS in this embodiment. Until the shortest distance to the movable end of the correction lens 113 in the OIS becomes equal to or less than a threshold, image stabilization control is made only with the OIS. In a case where the shortest distance to the movable end of the correction lens 113 in the OIS becomes equal to or less than the threshold, the IIS (driving of the image sensor 104) is started. As the shortest distance (second shortest distance) to the movable end of the correction lens 113 in the OIS becomes smaller, the proportion of the OIS in the correction ratio is decreased and the proportion of the IIS in the correction ratio is increased.

The EIS is not performed until the shortest distance to the movable end of the image sensor 104 in the IIS becomes equal to or less than a threshold. In a case where the shortest distance to the movable end of the image sensor 104 in IIS is equal to or less than the threshold, the EIS is started. As the shortest distance to the movable end of the image sensor 104 in the IIS becomes smaller, the proportion of the IIS in the correction ratio is decreased and the proportion of the EIS in the correction ratio is increased.

Figure 11A:
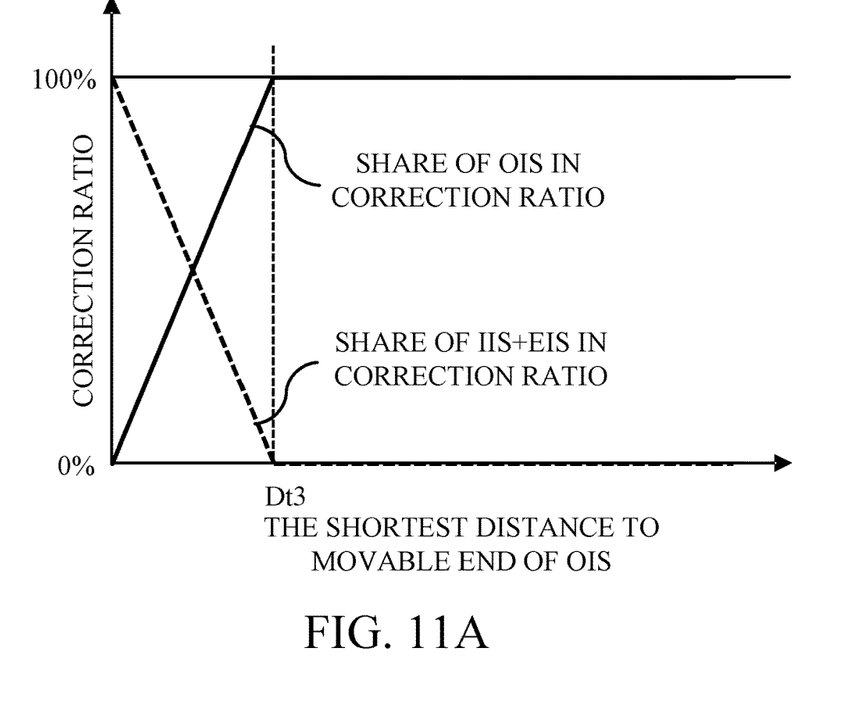
FIGS. 11A and 11B illustrate a relationship among the correction ratio, the shortest distance from the correction lens to the movable end, and the shortest distance from the image sensor to the movable end according to the third embodiment.
Figure 11B:
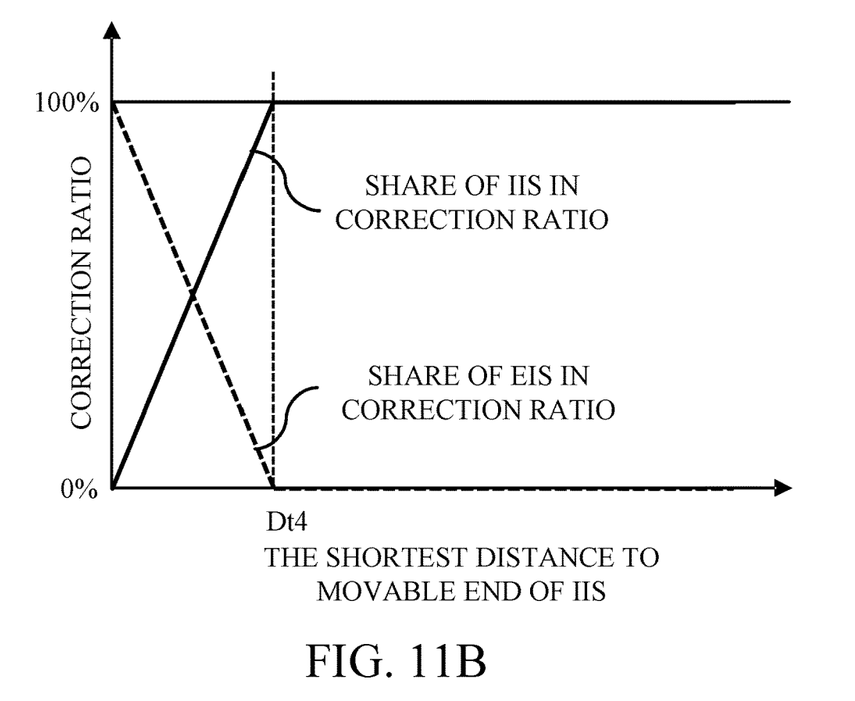

Referring now to FIGS. 11A and 11B, a description will be given of a relationship among the shortest distance from the correction lens 113 to the movable end in the OIS (shortest distance to movable end of OIS), the shortest distance from the image sensor 104 to the movable end in the IIS (to movable end of IIS), and the correction ratio.

FIG. 11A illustrates a relationship between the shortest distance to the movable end of the OIS and the correction ratio. In FIG. 11A, an abscissa axis indicates the shortest distance to the movable end of the OIS, and an ordinate axis indicates the correction ratio. In a case where the shortest distance to the movable end of the OIS is larger than a threshold Dt3, the proportion of the OIS in the correction ratio is set to 100%, and image stabilization control is performed only with the OIS. In a case where the shortest distance to the movable end of the OIS becomes smaller than the threshold Dt3, the IIS and EIS are started. As the shortest distance to the movable end of the OIS becomes smaller, the proportion of the combination of the IIS and EIS in the correction ratio are increased, and the proportion of the OIS in the correction ratio is decreased. In a case where the OIS reaches the movable end, the proportion of the combination of the IIS and EIS in the correction ratio is set to 100%, and image stabilization control is performed only with the IIS and EIS.

FIG. 11B illustrates a relationship between the shortest distance (second shortest distance) to the movable end of the IIS and the correction ratio. In FIG. 11B, an abscissa axis indicates the shortest distance to the movable end of IIS, and an ordinate axis indicates the correction ratio. In a case where the shortest distance to the movable end of the IIS is larger than a threshold Dt4, the proportion of the IIS in the correction ratio is set to 100%, and image stabilization control is performed only with the IIS. On the other hand, in a case where the shortest distance to the movable end of the IIS becomes smaller than the threshold Dt4, the EIS is started. As the shortest distance to the movable end of the IIS becomes smaller, the proportion of the EIS in the correction ratio is increased and the proportion of the IIS in the correction ratio is decreased. In a case where the IIS reaches the movable end, the proportion of the EIS in the correction ratio is set to 100%, and image stabilization control is performed only with the EIS.

Figure 12:
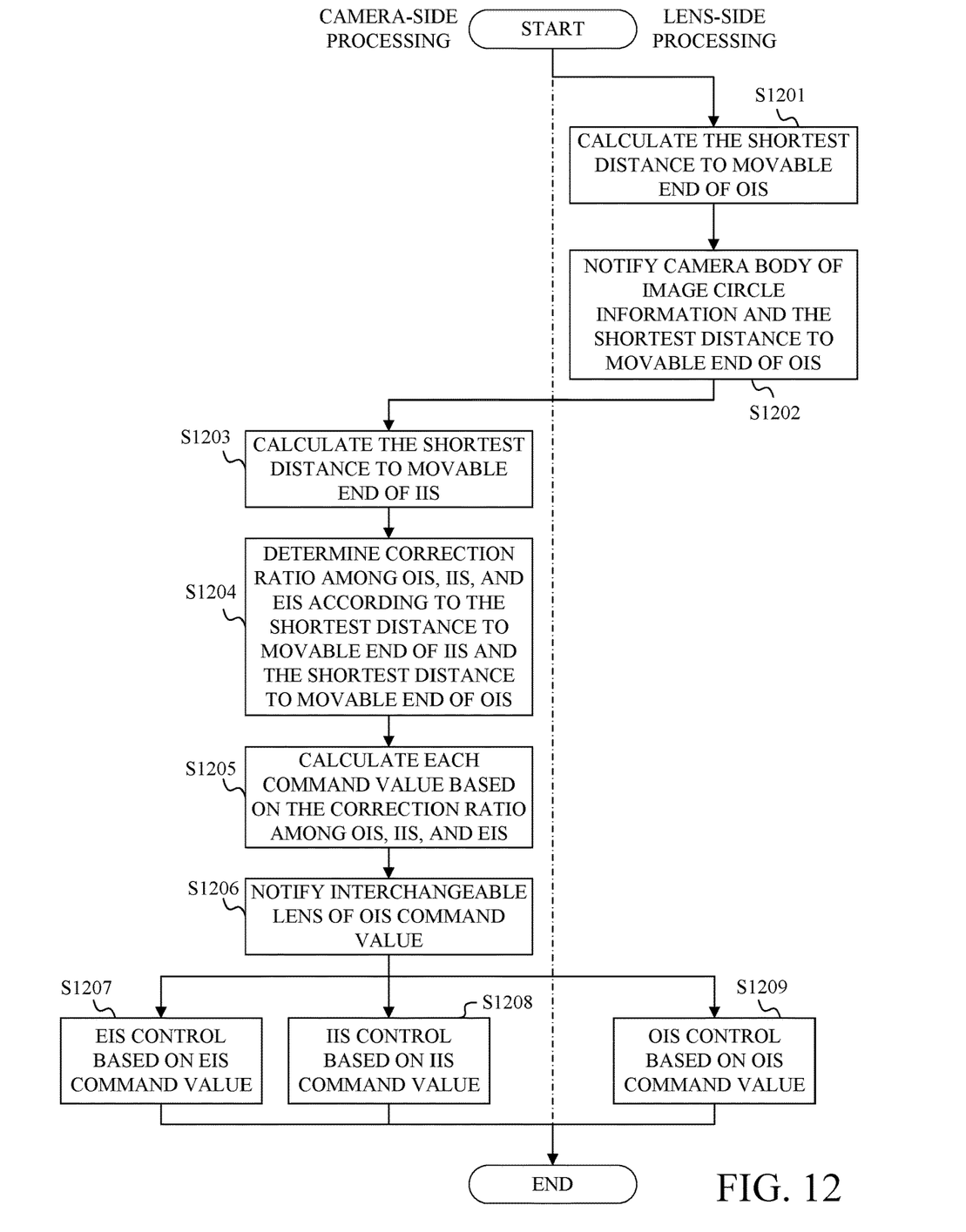
FIG. 12 is a flowchart of image stabilization processing according to the third embodiment.

Referring now to FIG. 12, a description will be given of image stabilization processing (control method) in the imaging system 10 according to this embodiment. FIG. 12 is a flowchart of the image stabilization processing. The left side of FIG. 12 illustrates processing to be performed by the camera body 100 (camera MPU 102), and the right side illustrates processing to be performed by the interchangeable lens 101 (lens MPU 109). The camera MPU 102 and lens MPU 109 execute the image stabilization processing according to a computer program. In a case where the camera body 100 is powered on, power is supplied to the interchangeable lens 101, and communication between the camera MPU 102 and the lens MPU 109 is started, this processing is started in step S1201.

First, in step S1201, the lens MPU 109 calculates the shortest distance from the current position of the correction lens to the movable end. At this time, since the movable end of the OIS changes according to the zoom state and focus state of the interchangeable lens 101, it is necessary to take this fact into account. Next, in step S1202, the lens MPU 109 notifies the camera body 100 of the shortest distance to the movable end of the OIS calculated in step S1201 and image circle information.

Next, in step S1203, the camera MPU 102 calculates the shortest distance to the movable end of the IIS based on the image circle information received from the lens MPU 109, the effective area of the image sensor 104, and information on a movable range that can be mechanically and electrically driven. Next, in step S1204, the camera MPU 102 determines the correction ratio among the OIS, IIS, and EIS. The correction ratio is determined, as described with reference to FIGS. 11A and 11B, based on the shortest distance to the movable end of the OIS received from the lens MPU 109 in step S1202 and the shortest distance to the movable end of the IIS calculated in step S1203.

Next, in step S1205, the camera MPU 102 calculates a correction command value for each of the OIS, IIS, and EIS based on their proportions in the correction ratio determined in step S1204. Next, in step S1206, the camera MPU 102 notifies the interchangeable lens 101 of the correction command value of the OIS.

Next, in step S1207, the camera MPU 102 performs image stabilization control using the EIS based on the correction command value (EIS command value) for the EIS calculated in step S1206. In step S1208, the camera MPU 102 performs image stabilization control using the IIS based on the correction command value (IIS command value) for the IIS calculated in step S1206. In step S1209, the lens MPU 109 performs image stabilization control using the OIS based on the correction command value (OIS command value) for the OIS calculated in step S1206.

Cooperative image stabilization can be performed with the OIS, IIS, and EIS by repeating the above steps at a high-speed period. This embodiment performs image stabilization control in the priority order the OIS and IIS, and image stabilization control is performed with the EIS for blur (correction residue) that cannot be completely corrected by the OIS and IIS. This configuration can provide image stabilization control that does not cause deterioration of image stabilization performance, noise, or shake.

In this embodiment, the calculating unit 102a calculates the second shortest distance from the current position of the image sensor (second image stabilization unit) to the position of the movable end. The determining unit 102b determines the correction ratio among the correcting lens (first image stabilization unit) 113, the image sensor (second image stabilization unit), and the electronic image stabilization unit (third image stabilization unit). At this time, the determining unit 102b increases the proportion of the third image stabilization unit in the correction ratio as the second shortest distance becomes shorter. In this embodiment, the correction lens 113 corresponds to the first image stabilization unit, and the image sensor 104 corresponds to the second image stabilization unit, but the lens 113 may correspond to the second image stabilization unit.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

As described above, in each embodiment, the determining unit 102b increases the proportion of the second image stabilization unit in the correction ratio as the shortest distance from the current position of the first image stabilization unit to the position of the movable end becomes shorter. In a case where the shortest distance is greater than a predetermined threshold (Dt1, Dt2, Dt3), the determining unit may perform image stabilization with the first image stabilization unit, and in a case where the shortest distance is less than the predetermined threshold, image stabilization may be performed by cooperatively controlling the first image stabilization unit and the second image stabilization unit. The determining unit may change the predetermined threshold based on at least one control characteristic (such as the overshoot characteristic and the follow-up characteristic) of the first image stabilization unit or the second image stabilization unit. The first image stabilization unit may have image stabilization performance (movable range, optical performance, image sensor performance, etc.) higher than that of the second image stabilization unit. The first image stabilization unit may consume power less than the second image stabilization unit.

Each embodiment can provide a control apparatus. an image pickup apparatus, a lens apparatus, a control method, and a storage medium (or program), each of which can perform (high-quality and high-performance) image stabilization while maintaining image stabilization performance without generating noise or shake using a plurality of image stabilization units.

For example, in each embodiment, the camera MPU 102 includes the calculating unit 102a and the determining unit 102b, but the lens MPU 109 or the like may perform at least part of at least one function of the calculating unit and the determining unit.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-183698, filed on Nov. 10, 2021, which is hereby incorporated by reference herein in its entirety.

What is claimed is:

1. A control apparatus configured to perform image stabilization using a first image stabilizer and a second image stabilizer, the control apparatus comprising:
a memory storing instructions; and
at least one processor that executes the instructions to:
determine a correction ratio between the first image stabilizer and the second image stabilizer so that a proportion of the second image stabilizer in the correction ratio increases as a distance to a movable end of the first image stabilizer decreases;
calculate a shortest distance from a current position of the first image stabilizer to a position of the movable end of the first image stabilizer; and
perform the image stabilization:
using the first image stabilizer in a state where the shortest distance is larger than a predetermined threshold; and
cooperatively controlling the first image stabilizer and the second image stabilizer in a state where the shortest distance is smaller than the predetermined threshold.

2. The control apparatus according to claim 1, wherein the at least one processor increases the proportion of the second image stabilizer in the correction ratio as the shortest distance becomes shorter.

3. The control apparatus according to claim 1, wherein the at least one processor changes the predetermined threshold based on at least one control characteristic of the first image stabilizer or the second image stabilizer.

4. The control apparatus according to claim 1, wherein:
the first image stabilizer includes a correction lens that constitutes part of an imaging optical system, and
the second image stabilizer includes an image sensor or an electronic image stabilizer.

5. The control apparatus according to claim 4, wherein the at least one processor calculates the shortest distance from the current position of the first image stabilizer to the position of the movable end of the first image stabilizer using information on at least one of a zoom state or a focus state of the imaging optical system.

6. The control apparatus according to claim 1, wherein:
the first image stabilizer includes an image sensor, and
the second image stabilizer includes a correction lens or an electronic image stabilizer.

7. The control apparatus according to claim 6, wherein the at least one processor calculates the shortest distance from the current position of the first image stabilizer to the position of the movable end of the first image stabilizer using information on an effective area of the image sensor and information on at least one of a zoom state or a focus state of an imaging optical system.

8. The control apparatus according to claim 1, wherein the at least one processor:
performs the image stabilization using the first image stabilizer, the second image stabilizer, and a third image stabilizer;
determines the correction ratio among the first image stabilizer, the second image stabilizer, and the third image stabilizer; so that a proportion of the third image stabilizer in the correction ratio increases as the distance to the movable end of the first image stabilizer from the second image stabilizer decreases.

9. The control apparatus according to claim 8, wherein:
the first image stabilizer includes a correction lens,
the second image stabilizer includes an image sensor, and
the third image stabilizer includes an electronic image stabilizer.

10. The control apparatus according to claim 8, wherein:
the first image stabilizer includes an image sensor,
the second image stabilizer includes a correction lens, and
the third image stabilizer includes an electronic image stabilizer.

11. An image pickup apparatus comprising:
an image sensor; and
the control apparatus according to claim 1.

12. A lens apparatus comprising:
an imaging optical system; and
the control apparatus according to claim 1.

13. A control method of performing image stabilization using a first image stabilizer and a second image stabilizer, the control method comprising:
determining a correction ratio between the first image stabilizer and the second image stabilizer so that a proportion of the second image stabilizer in the correction ratio increases as a distance to a movable end of the first image stabilizer decreases;
calculating a shortest distance from a current position of the first image stabilizer to a position of the movable end of the first image stabilizer; and
performing the image stabilization:
using the first image stabilizer in a state where the shortest distance is larger than a predetermined threshold; and
cooperatively controlling the first image stabilizer and the second image stabilizer in a state where the shortest distance is smaller than the predetermined threshold.

14. A non-transitory storage medium storing a program executable by a computer to execute the control method of performing image stabilization using a first image stabilizer and a second image stabilizer, the control method comprising:
determining a correction ratio between the first image stabilizer and the second image stabilizer so that a proportion of the second image stabilizer in the correction ratio increases as a distance to a movable end of the first image stabilizer decreases;
calculating a shortest distance from a current position of the first image stabilizer to a position of the movable end of the first image stabilizer; and
performing the image stabilization:
using the first image stabilizer in a state where the shortest distance is larger than a predetermined threshold; and
cooperatively controlling the first image stabilizer and the second image stabilizer in a state where the shortest distance is smaller than the predetermined threshold.

* * * * *